May 11, 1948.   H. H. BAKKEN   2,441,232
BAIT FISHHOOK
Filed Dec. 10, 1945
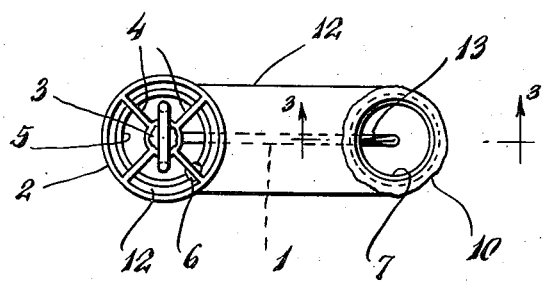
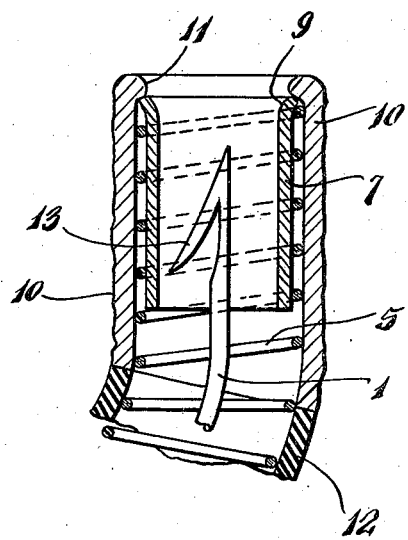
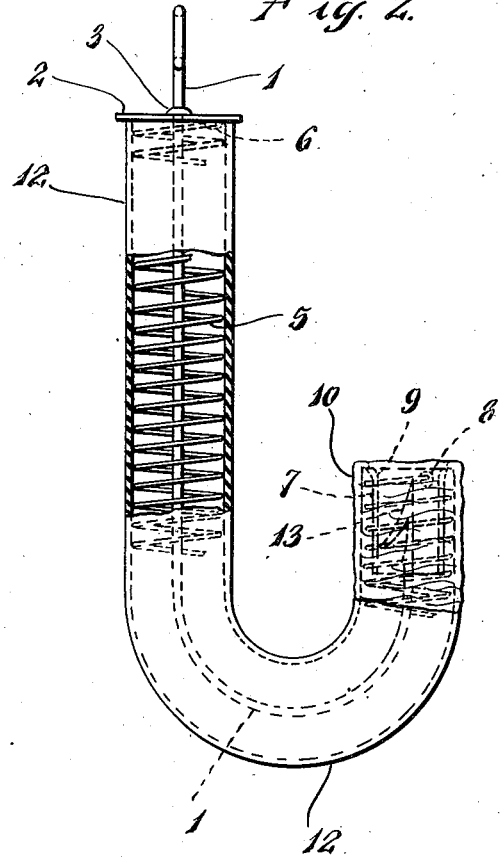
INVENTOR
Hans H. Bakken
BY Henry J. E. Metzler
Agt.

Patented May 11, 1948

2,441,232

UNITED STATES PATENT OFFICE 2,441,232

BAIT FISHHOOK

Hans H. Bakken, Pueblo, Colo.

Application December 10, 1945, Serial No. 633,912

2 Claims. (Cl. 43—40)

This invention relates generally to the class of fishing and trapping and pertains particularly to improvements in fishhooks.

The primary object of the present invention is to provide an improved fishhook in which means is employed for concealing the fishhook, particularly its pointed end portion by means of a tubular artificial bait, so that the hook has the appearance of a fat worm or the like.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Figure 1 is a top plan view of a preferred embodiment of my invention;

Fig. 2 is a side elevation of the same; and

Fig. 3 is a sectional view on the line 3—3 of Fig. 1, drawn at an enlarged scale and being partially broken away.

Similar reference characters refer to similar parts throughout the several views.

In the drawing the numeral 1 denotes a fish hook which may be of any customary shape or design, and to whose longitudinal stem portion there is secured a disk or plate 2 by means of a soldering connection 3 or in any other suitable manner. The disk 2 is perforated or is stamped out so as to form a star 4 (Fig. 1) having a rim that surrounds the extremities of the star 4. A tubular artificial bait 12, which may be made of rubber or the like, and which preferably has the outer appearance of a fat worm, is suspended from the disk 2; and a coiled spring 5 is contained within the bait 12. The upper extremity of the spring 5 is connected to the star 4 at 6, while its lower extremity is soldered at 8 to a sleeve member 7, whose outwardly bent upper portion 9 supports the inwardly protruding part 11 of the lower end portion 10 of the bait 12. The spring 5 holds the end portion 10 of the bait 12 in such a position that said end portion 10, which may be of another material than that used for the main portion of bait 12, is slightly above the pointed end 13 of the hook 1, as may be seen in Fig. 3, thus concealing the pointed hook portion 13 entirely.

When a fish bites into the lower end portion 10 of the bait 12, the same will slide downwardly, so that the hook end 13 will stick in the mouth of the fish.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described my said invention, what I claim as new and desire to secure by Letters Patent is:

1. A baited fish hook comprising a fish hook which has a longitudinal stem portion and a curved hook portion and whose upper stem portion has secured thereto a perforated plate, a tubular artificial bait being suspended from said plate and being extended over the major portion of the stem portion and over the hook portion so as to conceal the pointed hook end entirely, resilient means being contained within said artificial bait for keeping the opposite end of said bait above said pointed hook end, and means for connecting the opposite end of said bait to said resilient means.

2. A baited fish hook comprising a fish hook which has a longitudinal stem portion and a curved hook portion and whose upper stem portion has secured thereto a perforated plate, a tubular artificial bait whose upper extremity is suspended from said plate being extended over the major portion of the stem portion and over the hook portion so as to conceal the pointed end of the hook, a coiled spring being contained within said artificial bait for keeping the opposite end of said bait above said pointed hook end, and a sleeve member being arranged in the lower extremity of said spring for connecting the latter to the opposite end of said bait.

HANS H. BAKKEN.

REFERENCES CITED

The following references are of record in the file of this patent:

UNITED STATES PATENTS

| Number | Name | Date |
|---|---|---|
| 2,098,095 | Hoefler | Nov. 2, 1937 |
| 2,102,739 | Peters | Dec. 21, 1937 |